Feb. 1, 1938.  J. McARTHUR  2,106,755
FISH LURE
Filed May 1, 1936
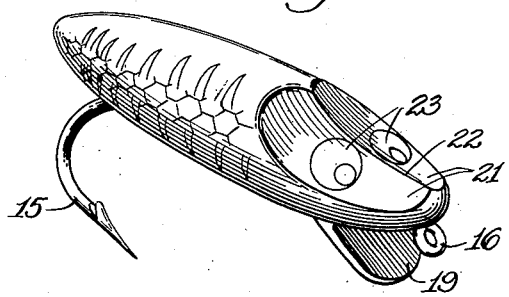
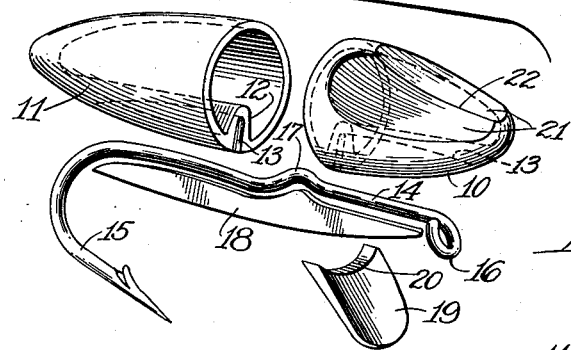
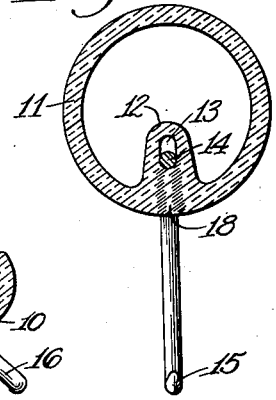
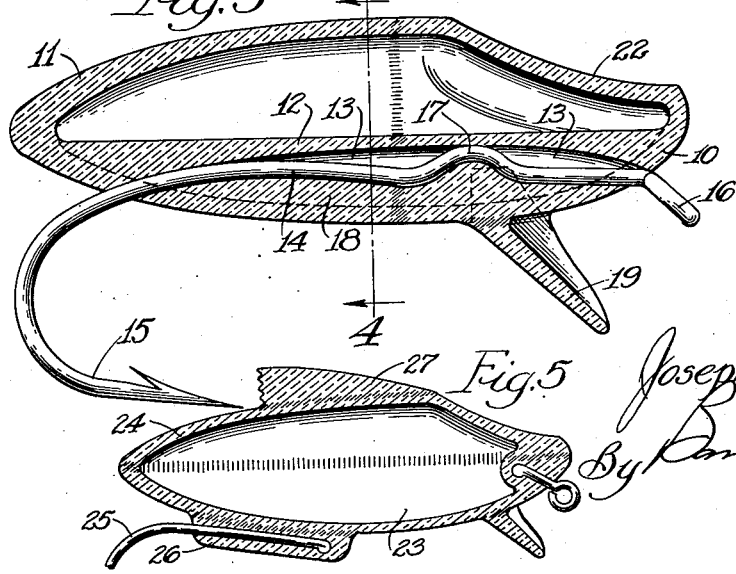
Inventor:
Joseph McArthur,
By Denning & Denning
Attys.

Patented Feb. 1, 1938

2,106,755

UNITED STATES PATENT OFFICE 2,106,755

FISH LURE

Joseph McArthur, Dowagiac, Mich., assignor to James Heddon's Sons, Dowagiac, Mich., a corporation of Michigan Application May 1, 1936, Serial No. 77,369

9 Claims. (Cl. 43—46)

The lure of the present invention in the form shown is designed primarily, though not exclusively, to serve as a casting lure for bass in lieu of a fly, bug, or similar small and light bait of the type commonly employed with a fly rod, although the features hereinafter described are adapted for use in plugs or other lures of larger and heavier characters than casting lures of the kind illustrated.

The invention relates in particular to a lure which is preferably made in sections from a composition of non-buoyant material, such as pyralin or the like, which sections are united together by coalescence in such a way as to seal the interior and thus provide a buoyant bait which may be scale finished or otherwise decorated to simulate a bug or small minnow. Certain of the features, however, are adapted for use in the formation of a solid bait or a hollow bait of non-sectional character so that it will be understood that the bait here shown serves merely to illustrate the invention in two of its possible embodiments.

In the form shown, the bait body is so constructed that when the sections are fitted together the shank of the hook may be inserted and sealed within the bait body in such a way as to reinforce the bait body and relieve the same from all strain when a fish is hooked.

The invention also relates to uniting and sealing of the sections in such a way as to cause the composition to coalesce at the joints and thus provide a smooth and unbroken surface impervious to the ingress of water, and to the provision made for the attachment of a collar, lip or other protuberant fitting of the kind required to finish the bait in the intended manner.

Further objects and details will appear from the description of the invention in conjunction with the accompanying drawing, wherein—

Figure 1 is a perspective view of the bait drawn on an enlarged scale;

Fig. 2 is a perspective view showing the sections comprising the bait in disassembled relation;

Fig. 3 is a longitudinal sectional elevation of the bait;

Fig. 4 is a cross sectional view taken on line 4—4 of Fig. 3; and

Fig. 5 is a sectional elevation showing modifications of the lure shown in the preceding figures.

The body, as shown in Figs. 1 to 4, is roughly of cigar shape and comprises a head section 10 and a tail section 11. The sections are preferably made of suitable composition of cellulosic material which is adapted, when treated with a proper solvent, to soften, so that when the sections of the composition thus softened are pressed together, a coalescence will occur, thereby integrally uniting the sections at the point of juncture.

The sections 10 and 11 are both hollow on the interior, which gives to each section a cup-shaped configuration, which is interrupted on the under side by the formation in each section of an inwardly protruding rib 12 which is grooved to afford a longitudinally extending channel 13. When the two sections are brought together, a continuous channel will be afforded along the under side of the bait for the reception of the shank 14 of a hook having a barb 15 and an eye 16. The shank is also provided near its center with an upward protrusion or hump 17, which as shown bears against the base of the channel 13.

The base of the channel, as shown, is of slightly bowed configuration from end to end, which affords contact near each end of the hook shank which, in conjunction with the contact afforded by the hump 17, serves to support the hook with the barb projecting downwardly below the tail end of the bait and the eye extending outwardly from a point near the forward end of the bait end on the under side thereof. The width of the channel 13 is sufficient only to permit the shank to be inserted with the hump 17 standing vertically, so that the contact of the hump with the side walls of the channel will prevent rotative movement of the hook.

The shank of the hook lies closely adjacent to the bottom of the channel, and the channel is closed by the provision of a narrow key piece 18 in the form of a fin, which is configured along its inner edge to closely contact the under side of the hook shank and to fit up into the hump and completely fill the outer portion of the channel 13, so that, when the key is in place, an unbroken surface will be afforded which conforms to the rounded configuration of the sections of the bait body and serves to completely imbed the hook shank within the body.

In assembling the body sections, the contiguous ends are softened to the extent necessary to secure coalescence of the material and are pressed together, after which the hook is laid in position and the key piece is likewise softened and fused to the walls of the channel 13. The assembly is completed by securing a resistance lip 19 of the same composition, which is obliquely disposed and of arcuate cross section and provided at its upper end with a curving thickened edge 20 which fits snugly against the under side of the body below the head portion and is united to the surface of the body in the manner previously described.

As shown, the front or head section 10 is provided with flattened or slightly dished and obliquely extending surfaces 21, which unite in a ridge 22 and afford surfaces for the painting of the eyes 23 to give the appearance of the head of a small minnow. After the sections of the bait have been assembled and united in the manner described the bait may be painted to give the desired coloration and finish.

By making the bait in the manner described, it is possible to employ a plastic composition having the desired capacity of softening with its own solvent, which enables the bait to be made of hollow sections each separately formed and afterwards united in such a way as to furnish the groove or channel required to receive the hook shank, and by employing a separate key piece of the same material the hook can be imbedded deeply within the body of the bait and held in firm and rigid union therewith, without, however, subjecting the bait body to strain incident to the struggles of a game fish when hooked, since the line of draft runs directly through the hook shank without being imparted to the body.

Fig. 5 illustrates a similar bait in which, however, the body sections 23 and 24 of plastic composition represent the upper and lower halves of the body and are fused together along their longitudinal meeting edges in the manner previously described. In this case, however, the hook 25 has its shank imbedded in a protuberant block 26 of the same material which is softened by its own solvent and united to the body in a firm and integral union. Similarly a fin 27 or other protuberant fitting or attachment may be preformed of the same material and united with a chambered or solid body in the manner described which obviates the necessity of employing metallic fittings or attachments of the kind commonly employed for a like purpose.

The finished bait, although made of non-buoyant material, provides a buoyant bait by reason of the sealing of the sections together, and the provision of an air chamber within. By making the bait of a suitable composition rather than of wood or the like, a hard smooth surface is provided as a base for the colors employed in finishing the bait, and no cracking or chipping or chafing will occur when the bait is subjected to actual use.

In certain of the claims I have referred to the union by coalescence of two portions of the same composition by which I mean that the two portions are either of identical material or of materials which, if chemically distinguishable are nevertheless so closely allied in composition that they will unite by coalescence into a mass which is actually or substantially integral as distinguished from a union effected by an interposed adherent or the like and I do not intend that the term "same composition" shall exclude variations from exact similitude which in no material degree affect or impair their capacity to unite in the manner stated.

I claim:

1. A bait consisting of a plurality of hollow sections of composition united together, at least one of the sections being provided with an exteriorly grooved rib, affording a continuous longitudinally extending channel, and a hook having its shank positioned within the channel.

2. A bait consisting of a plurality of hollow sections of composition united together by coalescence, each of the sections being provided with a grooved rib, the ribs being aligned to afford a continuous channel, and a hook having its shank positioned within the channel.

3. A bait consisting of a hollow body of composition provided with a grooved rib affording a channel and a hook having its shank positioned within the channel, and a key piece inserted into the channel exteriorly of the hook shank to retain and reinforce and conceal the same.

4. A bait consisting of a body of composition provided with an exteriorly opening channel, a hook having its shank positioned within the channel, and a key piece of the same composition inserted into the channel exteriorly of the hook shank and coalesced with the walls of the channel to retain and reinforce and conceal the hook shank.

5. A bait consisting of a plurality of hollow sections of composition united together, each of the sections being provided with an exteriorly grooved inwardly protruding rib, the two ribs being aligned to afford a continuous channel, a hook having its shank positioned within the channel, and a key piece of composition inserted within the channel and exteriorly of the hook shank and secured to the walls of the channel.

6. A bait consisting of a plurality of hollow sections of composition united together by fusion, each of the sections being provided with an exteriorly grooved inwardly protruding rib, the ribs being aligned to afford a continuous channel, a hook having its shank positioned within the channel, a key piece of composition inserted within the channel and exteriorly of the hook shank and coalesced to the walls of the channel, and a lip of composition extending from the forward portion of the bait body and coalesced thereto.

7. A fish bait consisting of a plurality of hollow sections of composition united by coalescence to afford a sealed hollow body having an exteriorly opening groove, and an added portion of the same composition entered within the groove and united to the body by coalescence and combining therewith to afford a localized thickening of the body wall.

8. A fish bait consisting of two hollow sections each formed to provide an inwardly projecting exteriorly grooved rib, the two sections being united together to bring the grooved ribs into alignment to afford a continuous channel along the under surface of the bait, a hook secured within the channel with its barb projecting beyond the rear end of the channel and its eye beyond the forward end of the channel, a key piece entered into the channel exteriorly of the hook shank with its outer edge in flush relation to the under surface of the bait body, and a lip secured to the under side of the bait body near the forward end thereof and extending downwardly therefrom to afford water resistance.

9. A bait consisting of a body having in its lower side a longitudinally extending channel, a hook having its shank positioned within the channel, and a key piece inserted into the channel exteriorly of the hook shank to retain and reinforce and conceal the same.

JOSEPH McARTHUR.